US012600650B2

(12) United States Patent
　　Lee

(10) Patent No.:　US 12,600,650 B2
(45) Date of Patent:　Apr. 14, 2026

(54) MULTI-STAGE APPARATUS FOR PRODUCING MAGNETIZED WATER

(71) Applicant: Sang Hun Lee, Incheon (KR)

(72) Inventor: Sang Hun Lee, Incheon (KR)

( * ) Notice: Subject to any disclaimer, the term of this patent is extended or adjusted under 35 U.S.C. 154(b) by 886 days.

(21) Appl. No.: 17/781,701

(22) PCT Filed: Nov. 27, 2020

(86) PCT No.: PCT/KR2020/017138
　　§ 371 (c)(1),
　　(2) Date: Jun. 1, 2022

(87) PCT Pub. No.: WO2021/112506
　　PCT Pub. Date: Jun. 10, 2021

(65) Prior Publication Data
　　US 2023/0002257 A1　　Jan. 5, 2023

(30) Foreign Application Priority Data

Dec. 2, 2019　(KR) ........................ 10-2019-0158326

(51) Int. Cl.
　　*C02F 1/48*　　　(2023.01)
　　*B03C 1/30*　　　(2006.01)
　　*C02F 103/02*　　(2006.01)
(52) U.S. Cl.
　　CPC ............ *C02F 1/48* (2013.01); *C02F 2103/02* (2013.01); *C02F 2201/48* (2013.01); *C02F 2307/06* (2013.01)
(58) Field of Classification Search
　　CPC .. B03C 1/30; B03C 1/01; B03C 1/286; B03C 1/0332; B03C 1/015; B03C 1/03; B03C 1/12; B03C 1/02; B03C 1/32; B03C 2201/18; A61L 2/02; A61L 9/16; B01L 2300/087; B01L 2400/043; C02F 1/482;
(Continued)

(56) References Cited

U.S. PATENT DOCUMENTS 3,631,985 A * 1/1972 Taeger ................... B01D 35/06
　　　　　　　　　　　　　　　　　210/222
4,146,479 A * 3/1979 Brown .................... C02F 1/481
　　　　　　　　　　　　　　　　　210/85
(Continued)

FOREIGN PATENT DOCUMENTS

JP　　2005-040694 A　　2/2005
JP　　2009-112187 A　　5/2009
(Continued)

OTHER PUBLICATIONS

International Search Report for PCT/KR2020/017138 mailed Mar. 22, 2021 from Korean Intellectual Property Office.

*Primary Examiner* — Allison G Fitzsimmons
(74) *Attorney, Agent, or Firm* — Revolution IP, PLLC

(57)　　　　ABSTRACT
A multi-stage magnetized water generator, includes: a housing; an inlet cap which is provided at an upper end of the housing and allows water to be introduced into the housing; a rotor provided in the housing to rotate water while being rotated by water inflowing through the inlet cap; a plurality of magnets which are provided in the rotor and come into contact with the water being rotated to magnetize the water; and an outlet cap which is provided at a lower end of the housing and allows the magnetized water to be discharged to an outside.

9 Claims, 11 Drawing Sheets

(58) Field of Classification Search
CPC ......... C02F 1/30; C02F 1/481; F02M 27/045;
H01F 7/0221; H01F 7/0294
USPC ....................................... 210/223, 222, 695
See application file for complete search history.

(56) References Cited

U.S. PATENT DOCUMENTS 4,904,381 A * 2/1990 Urakami ................. C02F 1/481
210/244
5,348,050 A * 9/1994 Ashton ................ F02M 27/045
210/222

FOREIGN PATENT DOCUMENTS

| KR | 10-1029159 B1 | 4/2011 | |
|----|----|----|----|
| KR | 10-1515330 B1 | 4/2015 | |
| KR | 10-1651498 B1 | 8/2016 | |
| KR | 10-1870430 B1 | 6/2018 | |
| KR | 10-1953863 B1 | 3/2019 | |
| WO | WO-2014003344 A1 * | 1/2014 | .............. B08B 6/00 |

* cited by examiner

[FIG. 1]
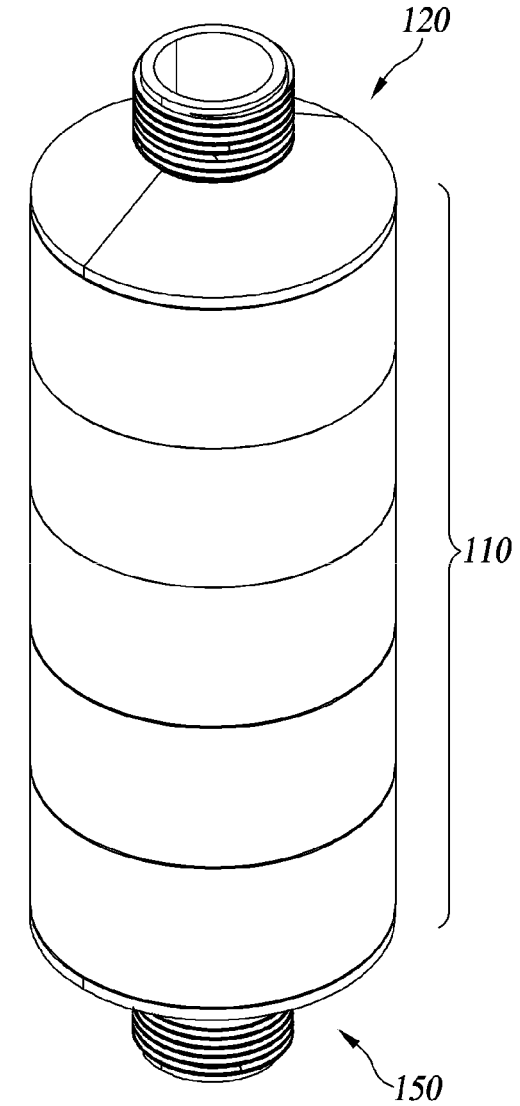

[FIG. 2]
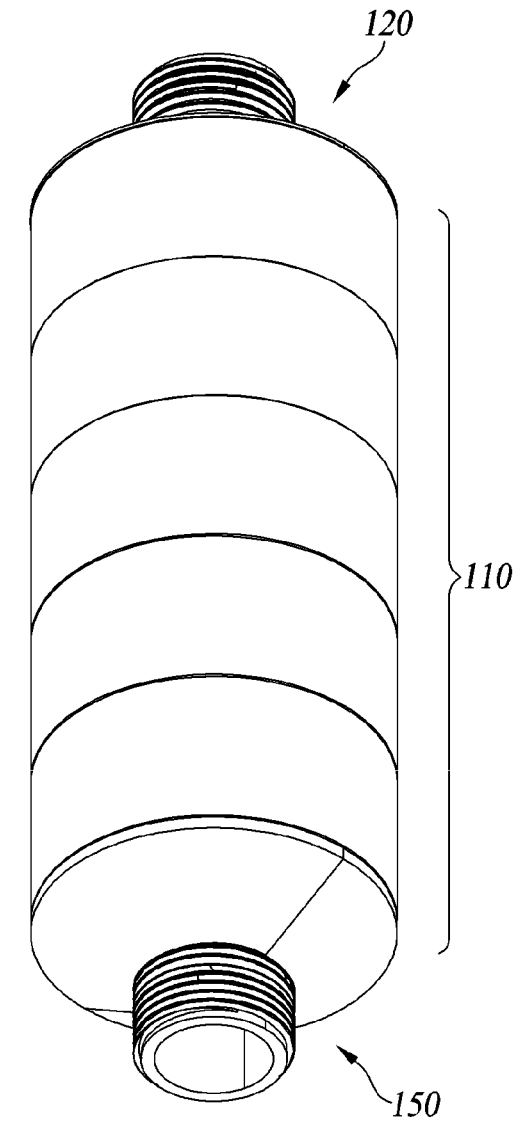

[FIG. 3]
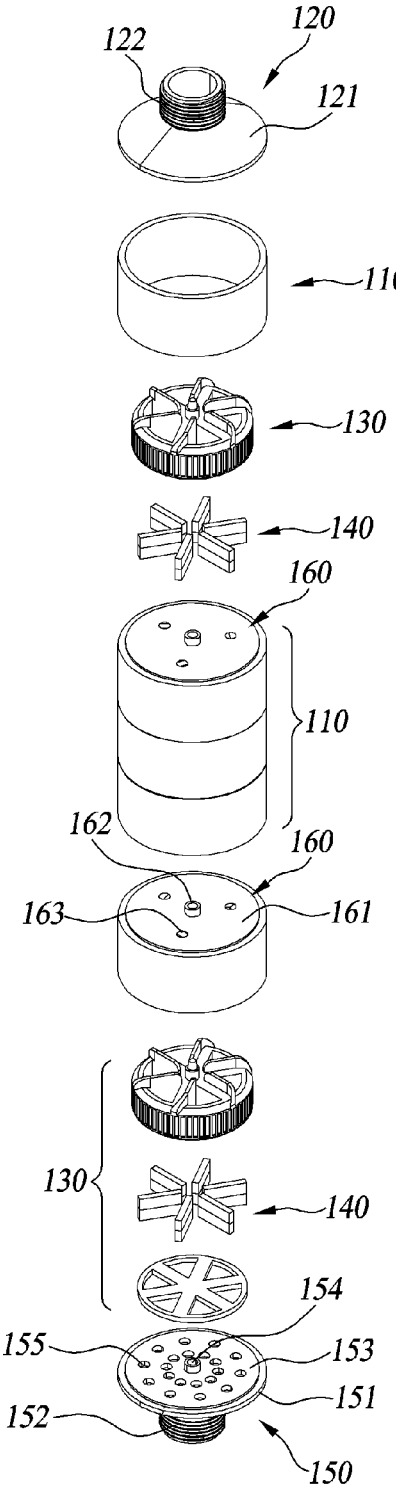

[FIG. 4]
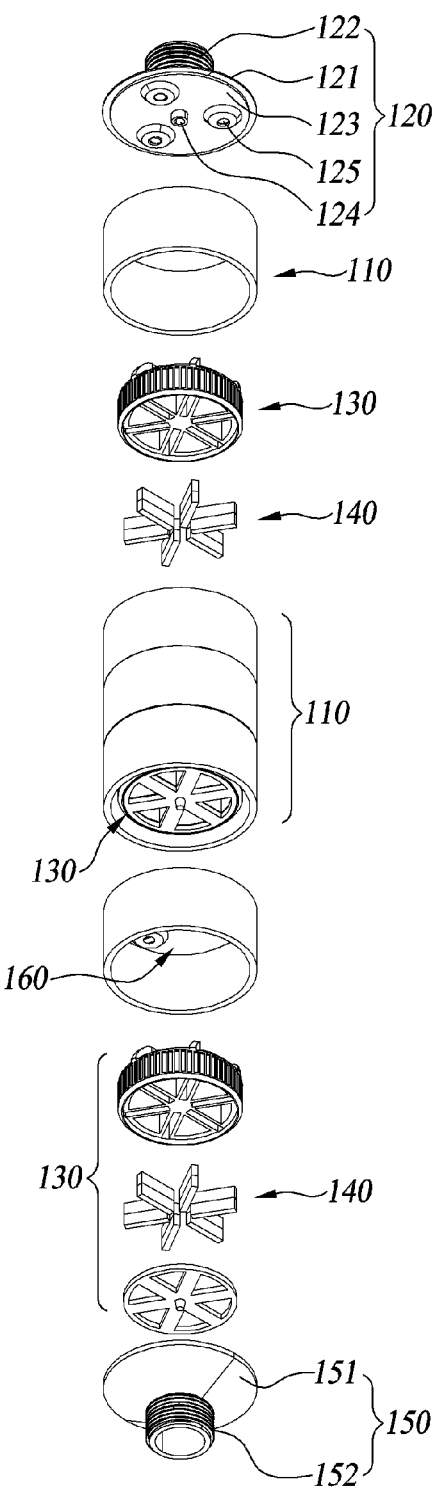

[FIG. 5]
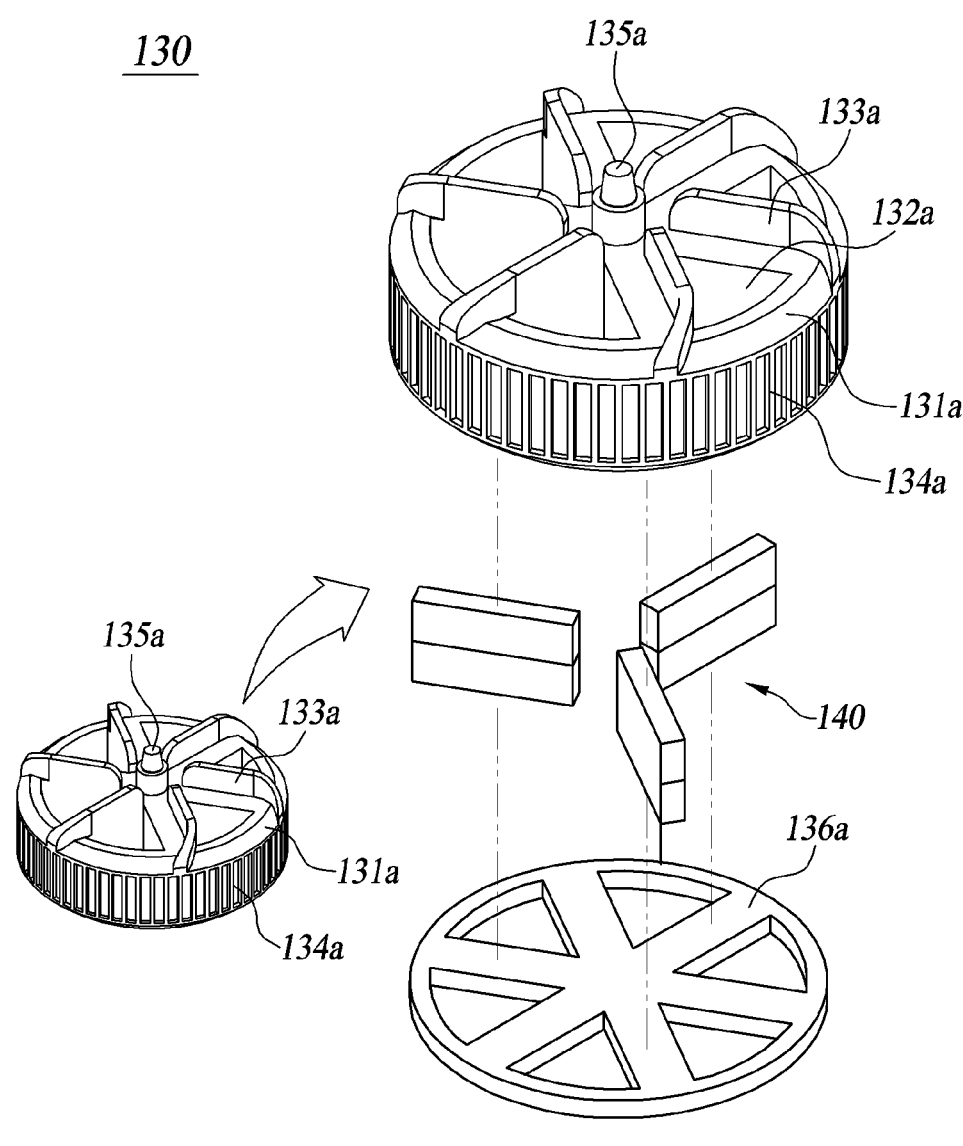

[FIG. 6]
*130*
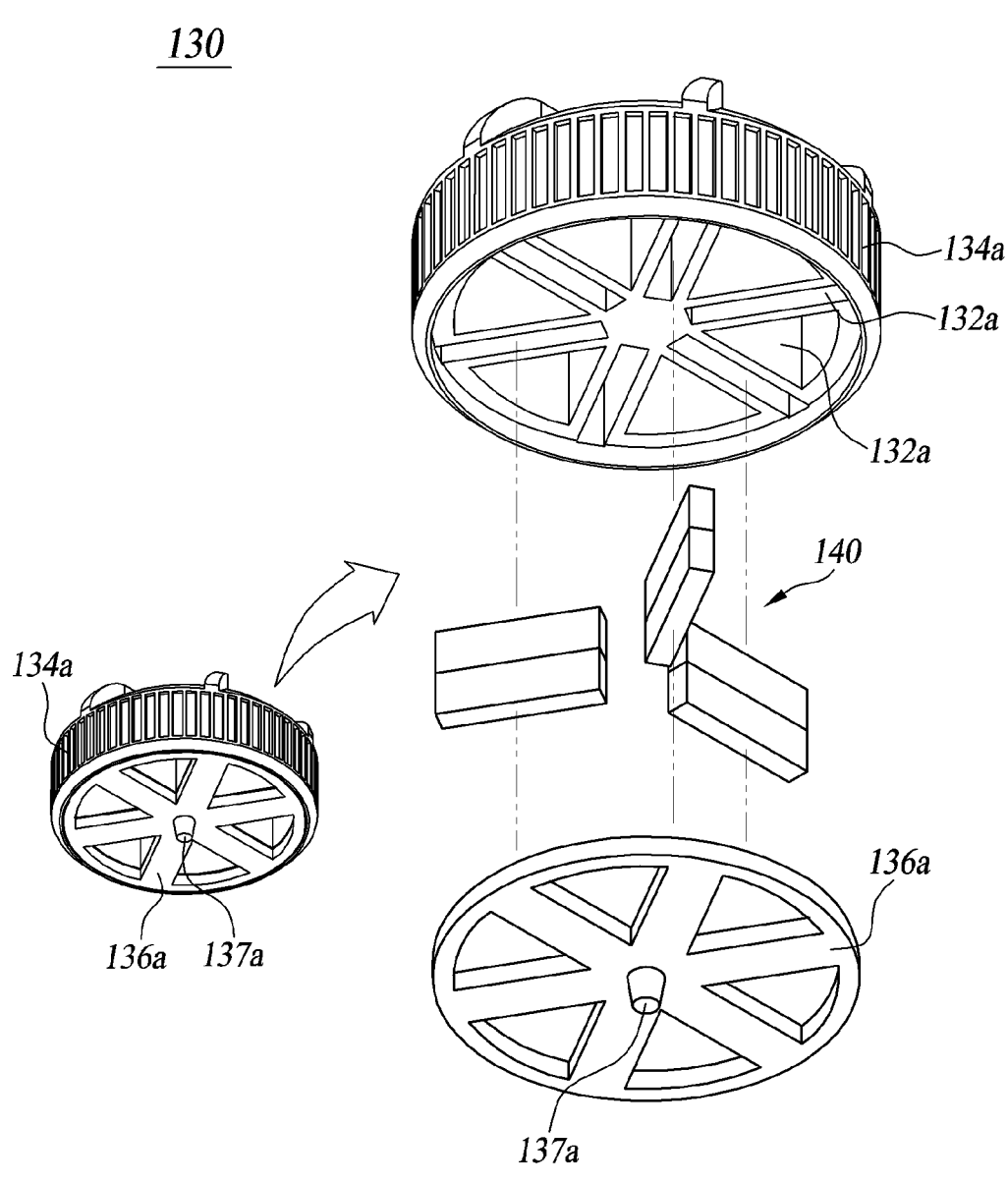

[FIG. 7]
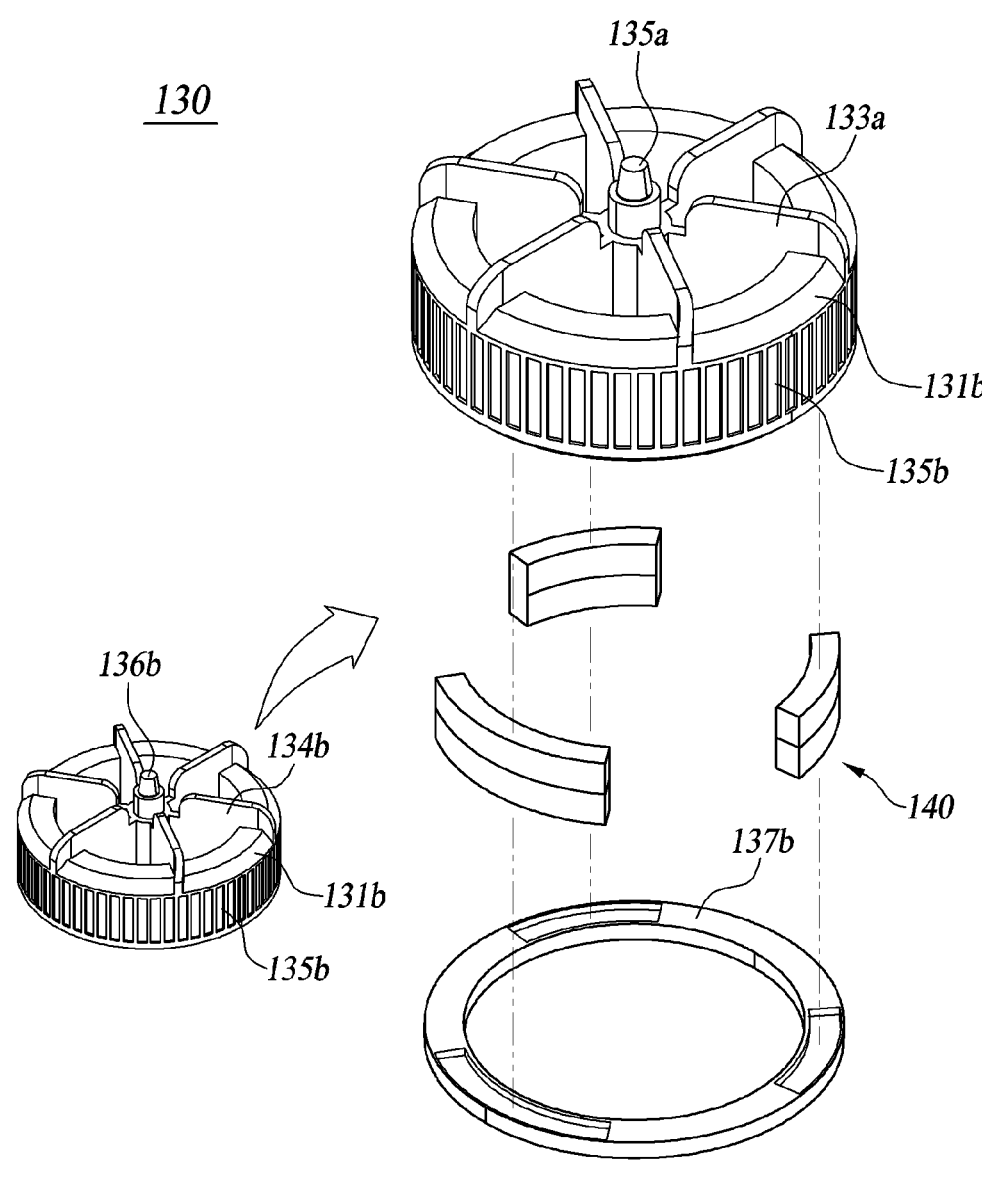

[FIG. 8]
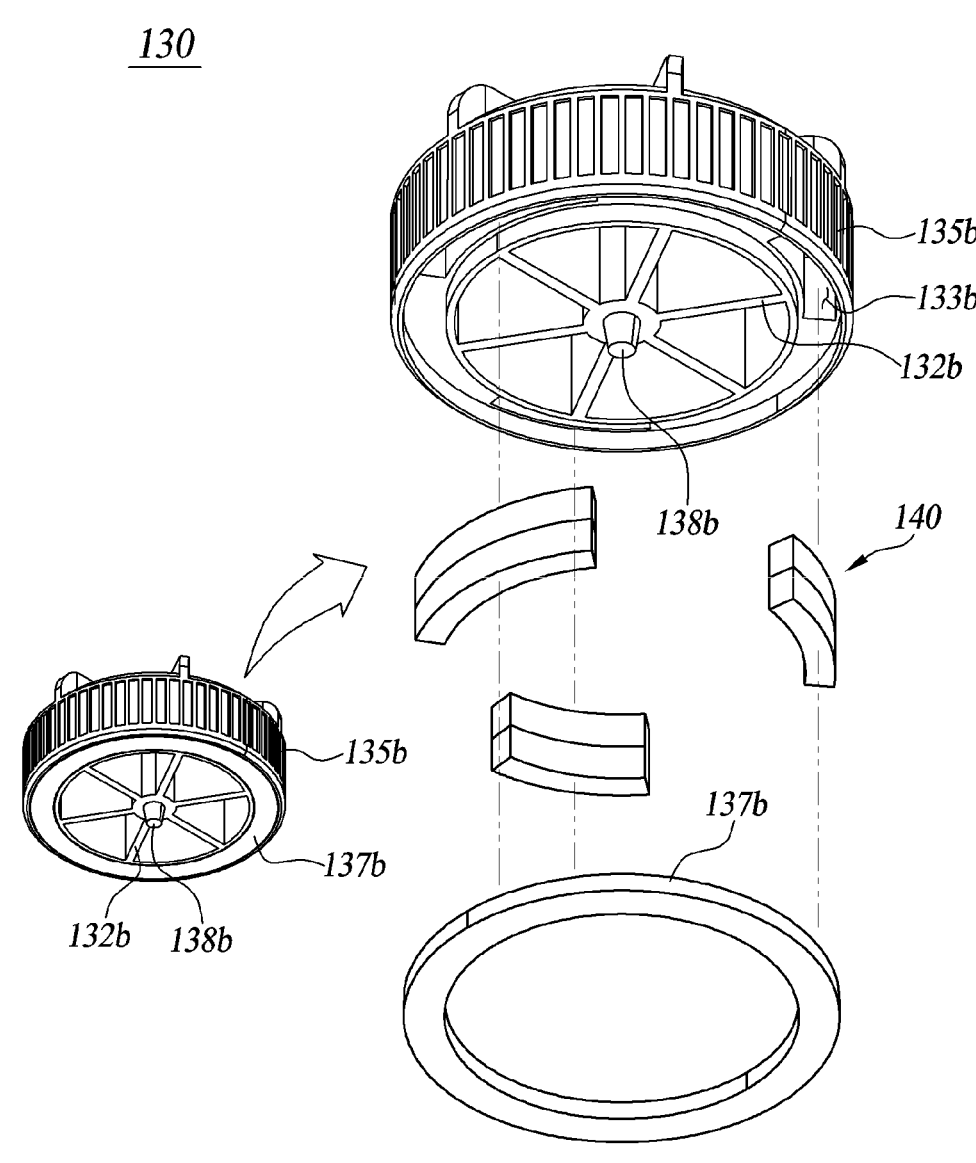
*130*
*135b*
*133b*
*132b*
*138b*
*140*
*135b*
*137b*
*132b*    *138b*
*137b*

[FIG. 9]
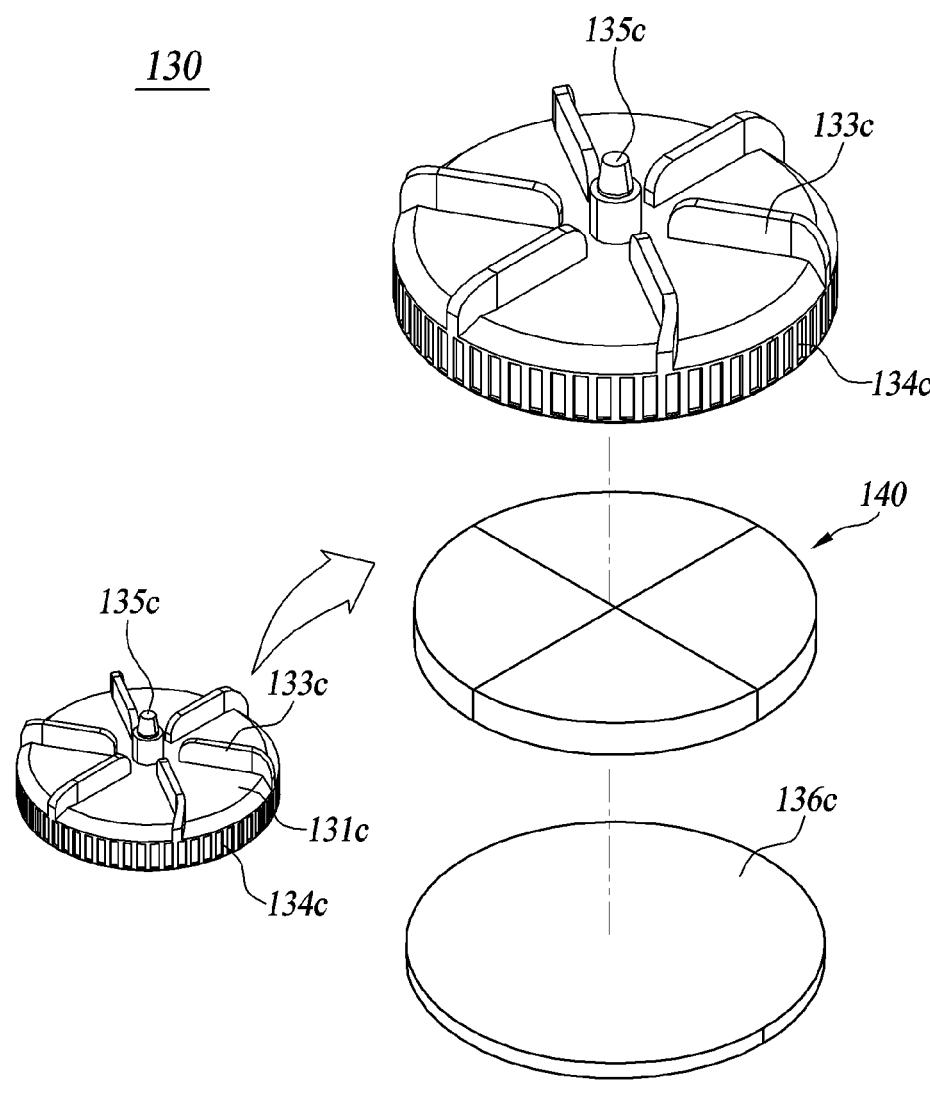

[FIG. 10]
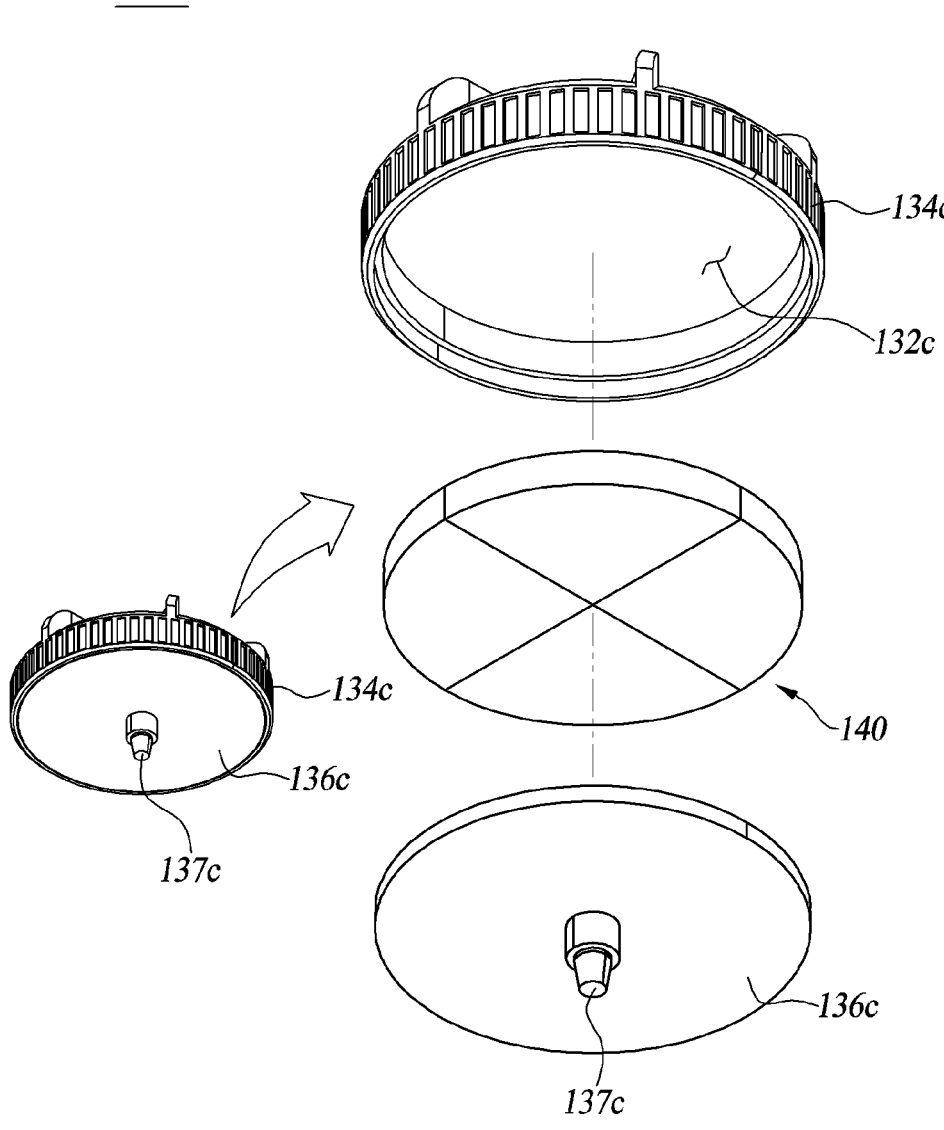

[FIG. 11]
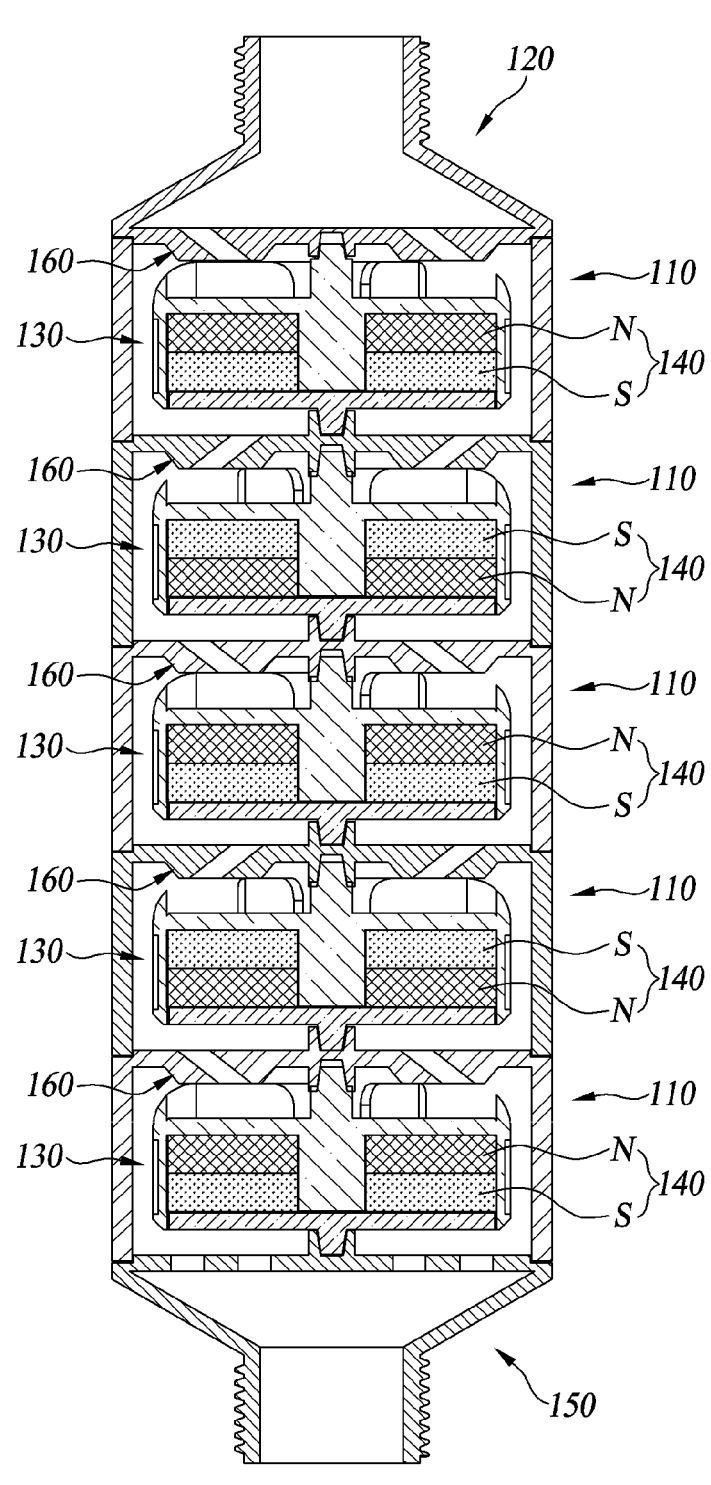

MULTI-STAGE APPARATUS FOR PRODUCING MAGNETIZED WATER

CROSS REFERENCE TO PRIOR APPLICATIONS

This application is a National Stage Application of PCT International Patent Application No. PCT/KR2020/017138 filed on Nov. 27, 2020, under 35 U.S.C. § 371, which claims priority to Korean Patent Application No. 10-2019-0158326 filed on Dec. 2, 2019 which are all hereby incorporated by reference in their entirety.

TECHNICAL FIELD

The present invention relates to a multi-stage apparatus for generating magnetized water, and more particularly, to an apparatus for generating magnetized water (hereinafter, "magnetized water generator") which may be used by connecting to a water hydrant such as a water purifier or a shower, or a fire hydrant, thereby causing water to be magnetized while rotating it in different directions, thus to generate magnetized water.

BACKGROUND ART

In general, the term "magnetization" refers to a phenomenon in which an object becomes to have magnetism, but magnetized water does not mean that water itself has magnetism. In other words, magnetized water means that the arrangement of water molecules changed by a magnetic field, such that the magnetized water becomes to have a molecular structure different from that of normal water, and refers to water whose molecular structure is transformed into a specific structure by the magnetic field. However, these characteristics are not continuously maintained, but are maintained for a certain period of time and then returned to an original state thereof.

Magnetic field lines of the magnetic field come from an N pole and lead to an S pole, and when water passes through such a magnetic field at a right angle, an electromotive force is generated at a right angle with respect to the direction of the enormous magnetic field lines, thereby causing micro currents to flow. At this time, water molecules are usually attached to each other to form a cluster.

In this state, if a strong magnetic field is formed therebetween, hydrogen ions with positive polarity and hydroxide ions with negative polarity adhere to each other, such that water molecules cause movements such as rotation and vibration, and thus, the water molecules are atomized and ions are activated.

In this regard, a magnetized water generator is configured to magnetize water by using the principle that water molecules become smaller as the hydrogen ions and hydroxide ions are subjected to the processes of separation and recombination when water passes through a magnetic field. Thereby, the magnetized water generator produces a sterilization effect by refinement of water molecules and provides an effect of removing scale or rust from water pipes, etc.

Therefore, when water passes through the magnetic field of a magnet, the molecular structure of water is ion-activated to change water into magnetized water having a hexagonal structure. The magnetized water generator using such a magnet is widely used in fields including domestic water, smart agriculture, firefighting and the like. However, since the conventional magnetized water Generator is configured in such a way that water is simply magnetized by magnets provided in a housing of the generator during passing through the housing instantaneously, there is little opportunity for water to come into contact with the magnets and be exposed to a magnetized space. Consequently, there is a problem in that the magnetization efficiency is greatly reduced.

SUMMARY OF INVENTION

Problems to be Solved by Invention

Accordingly, it is an object of the present invention to provide a multi-stage magnetized water generator which may be used by connecting to a water hydrant such as a water purifier or a shower, and a fire hydrant, etc., and in particular, may be used by connecting to various other systems for agricultural and smart farm, industrial, etc., thereby causing water to be magnetized while alternately rotating it in forward and reverse directions by rotors, thus to generate magnetized water.

In addition, another object of the present invention is to provide a multi-stage magnetized water generator in which rotors equipped with magnets are stacked in multiple stages to rotate water in directions opposite to each other, and the magnets facing each other generate complex magnetic force lines due to a repulsive force and an attractive force, thus to improve magnetization efficiency.

Meanwhile, the objects of the present invention are not limited to those described above, and other objects not described in this disclosure will be clearly understood by those skilled in the art from the following description.

Means for Solving Problems

According to an aspect of the present invention, there is provided a multi-stage magnetized water generator including: a housing; an inlet cap which is provided at an upper end of the housing and allows water to be introduced into the housing; a rotor provided in the housing to rotate water while being rotated by water inflowing through the inlet cap; a plurality of magnets which are provided in the rotor and come into contact with the water being rotated to magnetize the water; and an outlet cap which is provided at a lower end of the housing and allows the magnetized water to be discharged to an outside.

Herein, in the multi-stage magnetized water generator, it is preferable that a plurality of housings, rotors, and magnets are stacked between the inlet cap and the outlet cap, and other housings except for a housing located in an uppermost stage comprise an inlet cover body which is provided at the upper end thereof, respectively, and allows water to be introduced from a housing in an upper stage into a housing in a lower stage.

In addition, it is preferable that the plurality of rotors in the upper and lower stages rotate in directions opposite to each other.

Further, it is preferable that the rotor includes: a rotor body having a cylindrical structure whose upper and lower surfaces are opened; a plurality of magnet holders formed on an inner circumferential surface of the rotor body and having a cylindrical structure whose lower surface is opened to provide spaces in which the magnets are accommodated; a plurality of rotating blades which protrude from upper surfaces of the magnet holders and are configured to rotate the rotor body due to a hydraulic pressure of water introduced into the housing; projections which protrude from an outer circumferential surface of the rotor body at a predetermined in an upper mounting protrusion which protrudes from a central portion of upper surfaces of the magnet holders so that the rotor body is rotatably mounted in an inner space of the housing; a closing case which has a shape corresponding to cross-sections of the rotor body and the magnet holders and is attached to lower portions of the rotor body and the magnet holders; and a lower mounting protrusion which protrudes from a lower surface of the closing case so that the rotor body is rotatably mounted in an inner space of the housing.

Further, it is preferable that the rotor includes: a rotor body having a cylindrical structure whose upper and lower surfaces are opened; spokes formed on an inner circumferential surface of the rotor body; a plurality of magnet holders formed in a cylindrical structure whose lower surface is opened along an inner circumferential surface of the rotor body to provide spaces in which the magnets are accommodated; a plurality of rotating blades which protrude from upper surfaces of the spokes and are configured to rotate the rotor body due to a hydraulic pressure of water introduced into the housing; projections which protrude from an outer peripheral surface of the rotor body at a predetermined interval; an upper mounting protrusion which protrudes from a central portion of upper surfaces of the spokes so that the rotor body is rotatably mounted in an inner space of the housing; a closing case which has a shape corresponding to the cross-sections of the rotor body and the magnet holders and is attached to lower portions of the rotor body and the magnet holders; and a lower mounting protrusion which protrudes from a central portion of lower surfaces of the spokes corresponding to a center of the rotor body so that the rotor body is rotatably mounted in an inner space of the housing.

Further, it is preferable that the rotor includes: a rotor body having a circular plate structure whose upper surface is closed and lower surface is opened; a magnet holder corresponding to an inner lower space of the rotor body, in. which the magnets are accommodated; a plurality of rotating blades which protrude from an upper surface of the rotor body and are configured to rotate the rotor body due to a hydraulic pressure of water introduced into the housing; projections which protrude from an outer circumferential surface of the rotor body at a predetermined interval; an upper mounting protrusion which protrudes from a central portion of an upper surface of the rotor body so that the rotor body is rotatably mounted in an inner space of the housing; a closing case which has a shape corresponding to that of the lower surface of the rotor body and is attached to lower surface of the rotor body while covering the magnet holder; and a lower mounting protrusion which protrudes from a central portion of a lower surface of the closing case so that, the rotor body is rotatably mounted in an inner space of the housing.

Furthermore, it is preferable that the magnet is any one of a bar magnet or block-shaped magnet and a panel-shaped magnet which have either polarity of an N pole or an S pole, or polarities of an N pole and an S pole separately magnetized on upper and lower surfaces thereof.

Advantageous Effects

Therefore, according to the present invention, the multi-stage magnetized water generator may be used by connecting to a water hydrant such as a water purifier or a shower, and a fire hydrant, etc., and in particular, may be used by connecting to various other systems for agricultural and smart farm, industrial, etc., thereby causing water to be magnetized while alternately rotating it in forward and reverse directions by rotors, thus to generate magnetized water.

In addition, magnetized water generating means, i.e., the rotors equipped with magnets are stacked in multiple stages to rotate water in directions opposite to each other, and the magnets facing each other generate complex magnetic force lines due to a repulsive force and an attractive force, thus to improve the magnetization efficiency.

Meanwhile, the effects of the present invention are not limited to the advantages described above, and other effects not described in this disclosure will be clearly understood by those skilled in the art from the description of the claims.

BRIEF DESCRIPTION OF DRAWINGS

FIGS. 1 and 2 are top and bottom perspective views illustrating a multi-stage magnetized water generator according to a preferred embodiment of the present invention;

FIGS. 3 and 4 are top and bottom exploded perspective views illustrating the magnetized water generators shown in FIGS. 1 and 2, respectively;

FIGS. 5 and 6 are top and bottom perspective views illustrating a first embodiment of the rotor in the magnetized water generator of the present invention;

FIGS. 7 and 8 are top and bottom perspective views illustrating a second embodiment of the rotor in the magnetized water generator of the present invention;

FIGS. 9 and 10 are top and bottom perspective views illustrating a third embodiment of the rotor in the magnetized water generator of the present invention; and FIG. 11 is a cross-sectional view illustrating the magnetized water generator shown in FIG. 5.

MODE FOR CARRYING OUT INVENTION

Hereinafter, preferred embodiments of the present invention will be described in detail with reference to the accompanying drawings.

As shown in FIGS. 1 to 11, a multi-stage magnetized water generator according to a preferred embodiment of the present invention includes: housings 110 having a cylindrical structure; an inlet cap 120 which is provided at an upper end of a housing 110 in an uppermost stage and allows water to be introduced into the housing 110; rotors 130 respectively provided in the housings 110 to rotate water while being rotated by water inflowing through the inlet cap 120; a plurality of magnets 140 which are provided in each rotor 130 and come into contact with the water being rotated to magnetize the water; and an outlet cap 150 which is provided at a lower end of a housing 110 in a lowermost stage and allows the magnetized water to be discharged to an outside.

Herein, the magnetized water generator of the present invention may have a configuration in which the housings 110, the rotors 130, and the magnets 140 having the above-described configuration are continuously stacked between the inlet cap 120 and the outlet cap 150. In this case, other housings except for the housing located in the uppermost stage further include an inlet cover body 160 which is provided at the upper end thereof, respectively, and allows water to be introduced from a housing in an upper stage into a housing in a lower stage.

In addition, as described above, when the rotors 130 are continuously stacked, an inflow direction of water introduced into the housing 110 in the lower stage is opposite to that of water introduced into the housing in the upper stage by the inlet cover body 160. That is, due to the water flowing through the housings in directions opposite to each other, i.e., in forward and reverse directions by the rotors, the magnetization efficiency may be maximized.

The housing 110 is an accommodating member having a cylindrical structure, in which the inlet cover body 160 or the inlet cap 120 is coupled to the upper end thereof, and the rotor 130 and the magnets 140 are located therein, and includes a housing body having a cylindrical structure whose upper and lower ends are opened.

The inlet cap 120 is a member coupled to the upper end of the housing 110 and allowing water to be introduced into the housing 110, and includes: an inlet cap body 121 having a circular cap shape which covers the upper end of the housing 110 to provide a predetermined space therein; an inlet cap coupler 122 which extends from an upper end of the inlet cap body 121 and is detachably coupled to a water inlet pipe, so as to allow water to inflow into the inlet cap body 121; an inlet cap panel 123 configured to close a lower surface of the inlet cap body 121; an inlet cap bushing 124 formed at a central portion of a lower surface of the inlet cap panel 123 and configured to rotatably support an upper portion of the rotor 130 located in the housing 110; a plurality of water holes 125 which penetrate from an upper surface to the lower surface of the inlet cap panel 123 at an oblique angle, preferably at an angle of 45 degrees so that water is obliquely introduced into the housing 110 through the lower surface from the upper surface of the inlet cap panel 123 to rotate the rotor 130 due to a hydraulic pressure of water and the like.

The rotor 130 is a rotating member installed inside the housing 110 to rotate water while being rotated by water introduced into the housing 110, and according to a first embodiment shown in FIGS. 5 and 6, includes: a rotor body 131a located in the housing 110 and having a cylindrical structure whose upper and lower surfaces are opened; a plurality of magnet holders 132a formed in a spoke shape on an inner circumferential surface of the rotor body 131a and having a cylindrical structure whose lower surface is opened to provide spaces in which the magnets 140 are accommodated; a plurality of rotating blades 133a which protrude from upper surfaces of the magnet holders 132a and are configured to rotate the rotor body 131a due to a hydraulic pressure of water introduced into the housing 110 through the water holes 125 or water holes 163 to be described below; projections 134a which protrude from an outer circumferential surface of the rotor body 131a at a predetermined interval to rotate the water inflowing into and outflowing from the space between the rotor body 131a and the inner circumferential surface of the housing 110 when the rotor body 131a rotates; an upper mounting protrusion 135a protruding from the central portion of the upper surfaces of the magnet holders 132a corresponding to a center of the rotor body 131a, into which the inlet cap bushing 124 of the inlet cap 120 or a lower bushing 162 of the inlet cover body 160 to be described below is inserted, so that the rotor body 131a is rotatably mounted in the inner space of the housing 110; a closing case 136a which has a shape corresponding to cross-sections of the rotor body 131a and the magnet holders 132a and is attached to lower portions of the rotor body 131a and the magnet holders 132a so that the magnets 140 are accommodated in the magnet holders 132a; a lower mounting protrusion 137a protruding from a lower surface of the closing case 136a, into which the outlet cap bushing 154 of the outlet cap 150 or an upper bushing 164 of the inlet cover body 160 to be described below is inserted, so that the rotor body 131a is rotatably mounted in the inner space of the housing 110 and the like.

Herein, the rotating blade 133a is a portion which comes into direct contact with water injected from the water holes 125 or the water holes 163 to be described below, and preferably, an edge portion thereof has a curved shape so as to transmit water with a higher hydraulic pressure of water. Through this, when water comes into contact with the curved edge portion, the water does not flow while sliding along one surface of the rotating blade 133a as it is, but interference occurs in flow of water due to the curved shape. As a result, it is possible to ensure that the water with the increased hydraulic pressure is transmitted to the rotating blades 133a without loss.

Meanwhile, the rotor 130 is a rotating member installed inside the housing 110 to rotate water while being rotated by water introduced into the housing 110, and according to a second embodiment shown in FIGS. 7 and 8, includes: a rotor body 131b located in the housing 110 and having a cylindrical structure whose upper and lower surfaces are opened; spokes 132b formed in a plurality of partitions on an inner circumferential surface of the rotor body 131b; a plurality of magnet holders 133b formed in a cylindrical structure whose lower surface is opened along the inner circumferential surface of the rotor body 131b to provide spaces in which the magnets 140 are accommodated; a plurality of rotating blades 134b which protrude from the upper surfaces of the spokes 132b and are configured to rotate the rotor body 131b due to a hydraulic pressure of water introduced into the housing 110 through the water holes 125 or water holes 163 to be described below; projections 135b which protrude from an outer circumferential surface of the rotor body 131b at a predetermined interval to rotate the water inflowing into and outflowing from the space between the rotor body 131b and the inner circumferential surface of the housing 110 when the rotor body 131b rotates; an upper mounting protrusion 136b protruding from the central portion of the upper surfaces of the spokes 132b corresponding to a center of the rotor body 131b, into which the inlet cap bushing 124 of the inlet cap 120 or the lower bushing 162 of the inlet cover body 160 to be described below is inserted, so that the rotor body 131b is rotatably mounted in the inner space of the housing 110; a closing case 137b which has a shape corresponding to the cross-sections of the rotor body 131b and the magnet holders 133b and is attached to lower portions of the rotor body 131b and the magnet holders 133b so that the magnets 140 are accommodated in the magnet holders 133b; a lower mounting protrusion 138b protruding from the central portion of the lower surfaces of the spokes 132b corresponding to the center of the rotor body 131b, into which the outlet cap bushing 154 of the outlet cap 150 or the upper bushing 164 of the inlet cover body 160 to be described below is inserted, so that the rotor body 131b is rotatably mounted in the inner space of the housing 110 and the like.

Herein, the rotating blade 134b is a portion which comes into direct contact with water injected from the water holes 125 or the water holes 163 to be described below, and preferably, an edge portion thereof has a curved shape so as to transmit water with a higher hydraulic pressure. Through this, when water comes into contact with the curved edge portion, the water does not flow while sliding along one surface of the rotating blade 134b as it is, but interference occurs in flow of water due to the curved shape. As a result, it is possible to ensure that the water with the increased hydraulic pressure is transmitted to the rotating blades 134b without loss.

Meanwhile, the rotor 130 is a rotating member installed inside the housing 110 to rotate water while being rotated by water introduced into the housing 110, and according to a third embodiment shown in FIGS. 9 and 10, includes: a rotor body 131c located in the housing 110 and having a circular plate structure whose upper surface is closed and lower surface is opened; a magnet holder 132c corresponding to an inner lower space of the rotor body 131c, in which the magnets 140 are accommodated; a plurality of rotating blades 133c which protrude from an upper surface of the rotor body 131c in a spoke shape and are configured to rotate the rotor body 131c due to a hydraulic pressure of water introduced into the housing 110 through the water holes 125 or the water holes 163 to be described below; projections 134c which protrude from an outer circumferential surface of the rotor body 131c at a predetermined interval to rotate the water inflowing into and outflowing from the space between the rotor body 131c and the inner circumferential surface of the housing 110 when the rotor body 131c rotates; an upper mounting protrusion 135c protruding from the central portion of the upper surface of the rotor body 131c, into which the inlet cap bushing 124 of the inlet cap 120 or the lower bushing 162 of the inlet cover body 160 to be described below is inserted, so that the rotor body 131c is rotatably mounted in the inner space of the housing 110; a closing case 136c which has a shape corresponding to that of the lower surface of the rotor body 131c and is attached to lower surface of the rotor body 131c while covering the magnet holder 132c so that the magnets 140 are accommodated in the magnet holder 132c; a lower mounting protrusion 137c protruding from a central portion of a lower surface of the closing case 136c, into which the outlet cap bushing 154 of the outlet cap 150 or the upper bushing 164 of the inlet cover body 160 to be described below is inserted, so that the rotor body 131c is rotatably mounted in the inner space of the housing 110 and the like.

Herein, the rotating blade 133c is a portion which comes into direct contact with water injected from the water holes 125 or the water holes 163 to be described below, and preferably, an edge portion thereof has a curved shape so as to transmit water with a higher hydraulic pressure. Through this, when water comes into contact with the curved edge portion, the water does not flow while sliding along one surface of the rotating blade 133c as it is, but interference occurs in flow of water due to the curved shape. As a result, it is possible to ensure that the water with the increased hydraulic pressure is transmitted to the rotating blades 133c without loss.

Meanwhile, in the present invention, when the plurality of rotors 130 are continuously stacked in multiple stages, it is preferable that the inflow direction of water introduced into the housing 110 in the lower stage through the inlet cover body 160 is opposite to that of the housing in the upper stage. That is, it is preferable that the rotating blades at the upper and lower stages have a structure in which the edge portions thereof are curved in directions opposite to each other so that these rotating blades can be rotated in forward and reverse directions.

The magnet 140 is a magnetic member installed in the magnet holder of the rotor 130 and comes into contact with the rotating water to magnetize the water. The magnet may have any one of a rod or block shape and a sector or disk panel shape to be easily accommodated in the rotor body, that is, in the magnet holder. For example, the magnet may have either polarity of an N pole or an S pole, or polarities of an N pole and an S pole separately magnetized on upper and lower surfaces thereof.

The outlet cap 150 is a member coupled to the lower end of the housing 110 located at the lowermost stage and allowing the magnetized water to be discharged from the inside of the housing 110 to the outside, and includes: an outlet cap body 151 having a circular cap shape, which covers the lower end of the housing 110 to provide a predetermined space therein; an outlet cap coupler 152 extending from a lower end of the outlet cap body 151 and detachably coupled to a water outlet pipe, so as to allow the magnetized water to be discharged to the outside of the outlet cap body 151; an outlet cap panel 153 configured to close an upper surface of the outlet cap body 151; an outlet cap bushing 154 formed at a central portion of an upper surface of the outlet cap panel 153 and configured to rotatably support a lower portion of the rotor 130 located in the housing 110; a plurality of outlet holes 155 which penetrate from an upper surface to the lower surface of the outlet cap panel 153 so that the magnetized water is discharged to the outside of the housing 110 through the lower surface from the upper surface of the outlet cap panel 153.

Meanwhile, when the magnetized water generator has the configuration in which the housings 110, the rotors 130, and the magnets 140 having the above-described configuration are continuously stacked between the inlet cap 120 and the outlet cap 150, the inlet cover body 160 is a means placed at the upper ends of other housings except for the housing located in the uppermost stage to provide the function of the inlet cap 120, and includes: an inlet panel 161 configured to cover the upper end of the housing 110; the lower bushing 162 formed at the central portion of the lower surface of the inlet panel 161 and configured to rotatably support the upper portion of the rotor 130 located in the housing 110; a plurality of water holes 163 which penetrate from the upper surface to the lower surface of the inlet panel 161 at an oblique angle, preferably at an angle of 45 degrees so that water is obliquely introduced into the housing 110 through the lower surface from an upper surface of the inlet panel 161 to rotate the rotor 130 due to a hydraulic pressure of water; an upper bushing 164 formed at a central portion of the upper surface of the inlet panel 161 and configured to rotatably support the lower portion of the rotor 130 of the housing 110 located in the upper stage and the like.

Herein, as described above, when the rotors 130 are continuously stacked, it is preferable that the inlet cover body 160 has a structure in which injection angles of the water holes 163 at the upper and lower stages are opposite to each other so as to have a structure in which the rotors 130 at the upper and lower stages rotate in the forward and reverse directions.

Therefore, according to the magnetized water generator of the present invention, in a state in which the rotors 130 equipped with the magnets 140 are rotatably located in the housing 110, the hydraulic pressure of water flowing from the inlet cap 120 or the inlet cover body 160 is applied to the rotating blades of the rotors 130 to rotate the rotors 130 at a high speed, such that the water introduced into the housing 110 is magnetized by the magnets 140 mounted in the rotors 130.

Herein, it is possible for the magnetized water generator to have a simple structure for magnetization by enabling the use of a general magnet as the magnets 140 have the shape of any one of a rod or a block and a disk, and it is possible to generate very complex magnetic field lines in the space of the housing 110 as the magnets 140 directly rotate.

That is, according to the present invention, when two or more housings 110, rotors 130 and magnets 140 are continuously stacked between the inlet cap 120 and the outlet cap 150 while having the inlet cover bodies 160, the magnets 140 may have polarities facing each other due to repulsive forces. To this end, for example, as shown in FIG. 11, when any one of the magnets is a bar magnet having an N pole and an S pole, the magnets at the upper and lower stages adjacent thereto are arranged as bar magnets having an S pole and an N pole, respectively, such that magnetic field lines due to repulsive forces and magnetic force lines due to attractive forces are formed in a space between the housings 110 while surrounding the magnetic force lines due to the repulsive forces. As a result, water molecules located in the space are subject to rotation, translation and vibration due to the complex magnetic field lines, so that the magnetization efficiency and water ionization may be maximized.

In addition, as described above, when the rotors 130 are continuously stacked and the generator has a structure in which the inflow directions of the water introduced into the housings 110 cross in directions opposite to each other by the inlet cover bodies 160, the upper rotor rotates in forward direction while the lower rotor rotates in reverse direction to form more complex magnetic force lines, and thereby the magnetization efficiency may be maximized.

Hereinafter, the operation of the multi-stage magnetized water generator according to the preferred embodiment of the present invention will be described.

First, the inlet cap 120 and the outlet cap 150 are connected between the water inlet pipe and the water outlet pipe of a water sprayer, respectively.

In this state, when water inflows into the inlet cap 120 through the water inlet pipe of the water sprayer, water is introduced into the first housing 110 coupled to the inlet cap 120 with a strong hydraulic pressure according to the Bernoulli's principle.

Herein, as the water inflowing into the housing 110 is introduced at an oblique angle, the rotor 130 located in the housing 110 rotates due to the hydraulic pressure of water. Accordingly, the water introduced into the housing 110 is magnetized by the magnets 140 mounted in the rotors 130.

Then, the water magnetized inside the housing 110 is discharged to the water outlet pipe of the water sprayer through the outlet cap 150.

Meanwhile, in a state in which two or more housings 110, rotors 130, and magnets 140 are continuously stacked between the inlet cap 120 and the outlet cap 150 while having the inlet cover bodies 160, the inlet cap 120 and the outlet cap 150 are connected between the water inlet pipe and the water outlet pipe of the water sprayer, respectively.

Herein, any one type of rotors 130 among the three types rotors having the configurations shown in FIGS. 5 to 10 may be continuously stacked, or each type of rotors 130 may be stacked regularly or irregularly between the inlet cap 120 and the outlet cap 150.

In this state, when water inflows into the inlet cap 120 through the water inlet pipe of the water sprayer, water is introduced into the first housing 110 coupled to the inlet cap 120 with a strong hydraulic pressure according to Bernoulli's principle.

Herein, as the water inflowing into the housing 110 is introduced at an oblique angle, the rotor 130 located in the housing 110 rotates due to the hydraulic pressure of water. Accordingly, the water introduced into the housing 110 is magnetized by the magnets 140 mounted in the rotors 130.

Then, the water magnetized inside the housing 110 at the first stage is introduced into the housing 110 at the next stage through the inlet cover body 160 coupled to the housing 110 at the next stage with a strong hydraulic pressure according to Bernoulli's principle.

Herein, as the water inflowing into the housing 110 is introduced at an oblique angle, the rotor 130 located in the housing 110 rotates due to the hydraulic pressure of water. Accordingly, the water introduced into the housing 110 is magnetized by the magnets 140 mounted in the rotors 130.

At this time, in order for the magnets 140 continuously stacked between the inlet cap 120 and the outlet cap 150 to have polarities facing each other due to repulsive forces, for example, as shown in FIG. 11, when any one of magnets is a bar magnet having an N pole and an S pole, the magnets at the upper and lower stages adjacent thereto are arranged as bar magnets having an S pole and an N pole, respectively, such that magnetic field lines due to repulsive forces and magnetic force lines due to attractive forces are formed in the space between the housings 110 while surrounding the magnetic force lines due to the repulsive forces. As a result, water molecules located in the space are subject to rotation, translation and vibration due to the complex magnetic field lines, so that the magnetization efficiency and water ionization may be maximized.

Thereafter, after the above-described processes are repeated up to the housing 110 of the last stage, the water magnetized inside the last housing 110 is discharged to the water outlet pipe of the water sprayer through the outlet cap 150.

Therefore, according to the present invention, it is possible to generate magnetized water by connecting the magnetized water generator to a water hydrant such as a water purifier or a shower, or a fire hydrant, and causing water to be magnetized while rotating it in forward and reverse directions by the rotors.

In addition, magnetized water generating means, i.e., the rotors configured to rotate water and having magnets are stacked in multiple stages to rotate in directions opposite to each other, and the magnets facing each other generate complex magnetic force lines due to a repulsive force and an attractive force, thus to improve the magnetization efficiency.

While the present invention has been described with reference to the specific embodiments, various modifications may be made without departing from the scope of the present invention. Therefore, the scope of the invention should not be defined by the above-described embodiments, but should be defined by the claims and equivalents of the claims.

The invention claimed is:

1. A multi-stage magnetized water generator comprising:
a plurality of housings 110 stacked between an inlet cap 120 and an outlet cap 150;
the inlet cap 120 which is provided at an upper end of the housings 110 and allows water to be introduced into the housings 110;
a rotor 130 provided in each of the housings 110 to rotate water while being rotated by water inflowing through the inlet cap 120;
a plurality of magnets 140 which are provided in the rotor 130 and come into contact with the water being rotated to magnetize the water;
the outlet cap 150 which is provided at a lower end of the housings 110 and allows the magnetized water to be discharged to an outside, and
an inlet cover body 160 provided between two adjacent housings 110 among the housings 110 to allow water to flow through the housings 110.

2. The multi-stage magnetized water generator according to claim 1, wherein a plurality of rotors 130 in the housings 110 rotate in directions opposite to each other.

3. A multi-stage magnetized water generator comprising:

a housing 110;

an inlet cap 120 which is provided at an upper end of the housing 110 and allows water to be introduced into the housing 110;

a rotor 130 provided in the housing 110 to rotate water while being rotated by water inflowing through the inlet cap 120;

a plurality of magnets 140 which are provided in the rotor 130 and come into contact with the water being rotated to magnetize the water; and an outlet cap 150 which is provided at a lower end of the housing 110 and allows the magnetized water to be discharged to an outside, wherein the inlet cap 120 comprises:

an inlet cap body 121 which covers the upper end of the housing 110 to provide a predetermined space therein;

an inlet cap coupler 122 which extends from an upper end of the inlet cap body 121 and allows water to inflow into the inlet cap body 121;

an inlet cap panel 123 configured to close a lower surface of the inlet cap body 121;

an inlet cap bushing 124 formed at a central portion of a lower surface of the inlet cap panel 123 and configured to rotatably support an upper portion of the rotor 130 located in the housing 110; and a plurality of water holes 125 which penetrate from an upper surface to the lower surface of the inlet cap panel 123 at an oblique angle so that water is obliquely introduced into the housing 110 through the lower surface from the upper surface of the inlet cap panel 123 to rotate the rotor 130.

4. A multi-stage magnetized water generator comprising:

a housing 110;

an inlet cap 120 which is provided at an upper end of the housing 110 and allows water to be introduced into the housing 110;

a rotor 130 provided in the housing 110 to rotate water while being rotated by water inflowing through the inlet cap 120;

a plurality of magnets 140 which are provided in the rotor 130 and come into contact with the water being rotated to magnetize the water; and an outlet cap 150 which is provided at a lower end of the housing 110 and allows the magnetized water to be discharged to an outside, wherein the rotor 130 comprises:

a rotor body 131a having a cylindrical structure whose upper and lower surfaces are opened;

a plurality of magnet holders 132a formed on an inner circumferential surface of the rotor body 131a and having a cylindrical structure whose lower surface is opened to provide spaces in which the magnets 140 are accommodated;

a plurality of rotating blades 133a which protrude from upper surfaces of the magnet holders 132a and are configured to rotate the rotor body 131a due to a hydraulic pressure of water introduced into the housing 110;

projections 134a which protrude from an outer circumferential surface of the rotor body 131a at a predetermined interval;

an upper mounting protrusion 135a which protrudes from a central portion of the upper surfaces of the magnet holders 132a so that the rotor body 131a is rotatably mounted in an inner space of the housing 110;

a closing case 136a which has a shape corresponding to cross-sections of the rotor body 131a and the magnet holders 132a and is attached to lower portions of the rotor body 131a and the magnet holders 132a; and a lower mounting protrusion 137a which protrudes from a lower surface of the closing case 136a so that the rotor body 131a is rotatably mounted in an inner space of the housing 110.

5. The multi-stage magnetized water generator according to claim 1, wherein the rotor 130 comprises:

a rotor body 131b having a cylindrical structure whose upper and lower surfaces are opened;

spokes 132b formed on an inner circumferential surface of the rotor body 131b;

a plurality of magnet holders 133b formed in a cylindrical structure whose lower surface is opened along an inner circumferential surface of the rotor body 131b to provide spaces in which the magnets 140 are accommodated;

a plurality of rotating blades 134b which protrude from upper surfaces of the spokes 132b and are configured to rotate the rotor body 131b due to a hydraulic pressure of water introduced into the housing 110;

projections 135b which protrude from an outer peripheral surface of the rotor body 131b at a predetermined interval;

an upper mounting protrusion 136b which protrudes from a central portion of upper surfaces of the spokes 132b so that the rotor body 131b is rotatably mounted in an inner space of the housing 110;

a closing case 137b which has a shape corresponding to the cross-sections of the rotor body 131b and the magnet holders 133b and is attached to lower portions of the rotor body 131b and the magnet holders 133b; and a lower mounting protrusion 138b which protrudes from a central portion of lower surfaces of the spokes 132b corresponding to a center of the rotor body 131b so that the rotor body 131b is rotatably mounted in an inner space of the housing 110.

6. The multi-stage magnetized water generator according to claim 1, wherein the rotor 130 comprises:

a rotor body 131c having a circular plate structure whose upper surface is closed and lower surface is opened;

a magnet holder 132c corresponding to an inner lower space of the rotor body 131c, in which the magnets 140 are accommodated;

a plurality of rotating blades 133c which protrude from an upper surface of the rotor body 131c and are configured to rotate the rotor body 131c due to a hydraulic pressure of water introduced into the housing 110;

projections 134c which protrude from an outer circumferential surface of the rotor body 131c at a predetermined interval;

an upper mounting protrusion 135c which protrudes from a central portion of an upper surface of the rotor body 131c so that the rotor body 131c is rotatably mounted in an inner space of the housing 110;

a closing case 136c which has a shape corresponding to that of the lower surface of the rotor body 131c and is attached to lower surface of the rotor body 131c while covering the magnet holder 132c; and a lower mounting protrusion 137c which protrudes from a central portion of a lower surface of the closing case 136c so that the rotor body 131c is rotatably mounted in an inner space of the housing 110.

7. A multi-stage magnetized water generator comprising:
a housing 110;
an inlet cap 120 which is provided at an upper end of the housing 110 and allows water to be introduced into the housing 110;
a rotor 130 provided in the housing 110 to rotate water while being rotated by water inflowing through the inlet cap 120;
a plurality of magnets 140 which are provided in the rotor 130 and come into contact with the water being rotated to magnetize the water; and
an outlet cap 150 which is provided at a lower end of the housing 110 and allows the magnetized water to be discharged to an outside,
wherein the magnet 140 is any one of a bar magnet or block-shaped magnet and a panel-shaped magnet which have either polarity of an N pole or an S pole, or polarities of an N pole and an S pole separately magnetized on upper and lower surfaces thereof.

8. A multi-stage magnetized water generator comprising:
a housing 110;
an inlet cap 120 which is provided at an upper end of the housing 110 and allows water to be introduced into the housing 110;
a rotor 130 provided in the housing 110 to rotate water while being rotated by water inflowing through the inlet cap 120;
a plurality of magnets 140 which are provided in the rotor 130 and come into contact with the water being rotated to magnetize the water; and
an outlet cap 150 which is provided at a lower end of the housing 110 and allows the magnetized water to be discharged to an outside,
wherein the outlet cap 150 comprises:

an outlet cap body 151 which covers the lower end of the housing 110 to provide a predetermined space;
an outlet cap coupler 152 which extends from a lower end of the outlet cap body 151 and allows the magnetized water to be discharged to an outside of the outlet cap body 151;
an outlet cap panel 153 configured to close an upper surface of the outlet cap body 151;
an outlet cap bushing 154 formed at a central portion of an upper surface of the outlet cap panel 153 to rotatably support a lower portion of the rotor 130 located in the housing 110; and
a plurality of outlet holes 155 which penetrate from an upper surface to the lower surface of the outlet cap panel 153 so that the magnetized water is discharged to the outside of the housing 110 through the lower surface from the upper surface of the outlet cap panel 153.

9. The multi-stage magnetized water generator according to claim 1, wherein the inlet cover body 160 comprises:
an inlet panel 161 configured to cover the upper end of the housing 110;
a lower bushing 162 formed at the central portion of a lower surface of the inlet panel 161 and configured to rotatably support the upper portion of the rotor 130 located in the housing 110;
a plurality of water holes 163 which penetrate from an upper surface to the lower surface of the inlet panel 161 at an oblique angle so that water is obliquely introduced into the housing 110 through the lower surface from an upper surface of the inlet panel 161 to rotate the rotor 130; and
an upper bushing 164 formed at a central portion of the upper surface of the inlet panel 161 and configured to rotatably support the lower portion of the rotor 130.

* * * * *